(12) United States Patent
Greer et al.

(10) Patent No.: US 7,216,205 B2
(45) Date of Patent: May 8, 2007

(54) CACHE LINE OWNERSHIP TRANSFER IN MULTI-PROCESSOR COMPUTER SYSTEMS

(75) Inventors: Christopher Alan Greer, Allen, TX (US); Michael Alex Schroeder, Dallas, TX (US); Gary Belgrave Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 388 days.

(21) Appl. No.: 10/756,436

(22) Filed: Jan. 12, 2004

(65) Prior Publication Data

US 2005/0154840 A1   Jul. 14, 2005

(51) Int. Cl.
  *G06F 12/00* (2006.01)
(52) U.S. Cl. .................. 711/147; 711/169; 707/200; 707/201; 709/205; 709/212; 709/213; 709/230; 709/232; 712/225
(58) Field of Classification Search ............... 711/145, 711/119, 169; 707/200, 201, 205, 212, 213, 707/230, 232; 712/225
See application file for complete search history.

(56) References Cited

U.S. PATENT DOCUMENTS

| | | | |
|---|---|---|---|
| 6,275,907 B1 * | 8/2001 | Baumgartner et al. ...... 711/143 |
| 6,374,333 B1 | 4/2002 | Arimilli et al. | |
| 6,381,681 B1 * | 4/2002 | McCracken et al. ........ 711/152 |
| 6,484,241 B2 | 11/2002 | Arimilli et al. | |
| 6,640,289 B2 | 10/2003 | McCrory et al. | |
| 6,829,683 B1 * | 12/2004 | Kuskin ....................... 711/145 |
| 6,868,481 B1 * | 3/2005 | Gaither et al. .............. 711/119 |
| 6,981,106 B1 * | 12/2005 | Bauman et al. ............. 711/146 |
| 2003/0056068 A1 * | 3/2003 | McAllister et al. ......... 711/156 |
| 2004/0024839 A1 * | 2/2004 | Okochi et al. .............. 709/214 |
| 2005/0033924 A1 * | 2/2005 | Glasco ....................... 711/119 |

* cited by examiner

*Primary Examiner*—Stephen C. Elmore
*Assistant Examiner*—Daniel Kim

(57) ABSTRACT

Transferring cache line ownership between processors in a shared memory multi-processor computer system. A request for ownership of a cache line is sent from a requesting processor to a memory unit. The memory unit receives the request and determines which one of a plurality of processors other than the requesting processor has ownership of the requested cache line. The memory sends an ownership recall to that processor. In response to the ownership recall, the other processor sends the requested cache line to the requesting processor, which may send a response to the memory unit to confirm receipt of the requested cache line. The other processor may optionally send a response to the memory unit to confirm that the other processor has sent the requested cache line to the requesting processor. A copy of the data for the requested cache line may, under some circumstances, also be sent to the memory unit by the other processor as part of the response.

19 Claims, 2 Drawing Sheets

CACHE LINE OWNERSHIP TRANSFER IN MULTI-PROCESSOR COMPUTER SYSTEMS

BACKGROUND

In shared memory, multi-processor computer systems, cache miss latency has a significant effect on system performance. (In the context of the invention, "processor" includes, but is not limited to, central processing units (CPUs) and I/O processing agents.) As those skilled in the art will understand, a "cache miss" occurs when a processor checks its cache for data and discovers that the desired data is not in the cache. A "cache miss" is the opposite of a "cache hit," which occurs when the requested information is in the cache. If a cache miss occurs, the processor must request the desired data, referred to as a "cache line," from the computer system's memory subsystem. The time it takes a processor to check its cache, discover that the data is not in the cache, request the desired data from the memory subsystem, and receive the data from the memory subsystem, is time during which the processor is idle, and is referred to as cache miss latency.

In a large system, cache miss latency can be extremely large, particularly where a processor requests ownership of a cache line owned by a different processor located at a remote cell. A cell is a sub-module of the system and typically has a number of system resources, such as central processing units (CPUs), central agent controllers, input/output (I/O) processing units, and memory. Cells can be configured as a single shared memory domain or as part of multiple cells grouped together to form a shared memory domain. Several steps are involved in transferring ownership of a cache line between processors, and each step increases cache miss latency.

SUMMARY

The invention aims to reduce cache miss latency by reducing the number of steps in transferring ownership of a cache line, thus reducing latency. In one aspect, the invention encompasses a method of transferring ownership of a cache line between processors in a shared memory multi-processor computer system. The method comprises sending a request for ownership of a cache line from a first processor to a memory unit. The memory unit receives the request and determines which one of a plurality of processors other than the first processor has ownership of the requested cache line. The memory sends a recall for ownership to that other processor. The cache line data with ownership is sent from the other processor to the first processor in response to the recall. A response may be sent from the first processor to the memory unit to confirm receipt of the ownership of the requested cache line by the first processor.

Optionally, an additional response may be sent from the other processor to the memory unit to confirm that the other processor has sent the ownership of the requested cache line to the first processor. A copy of the requested cache line data may, but need not always, be sent to the memory unit as part of this additional response.

The invention encompasses both cell-based and non cell-based computer systems. For cell-based systems, the invention encompasses both single cell shared memory systems and multiple cell systems forming a single shared memory domain. The processors and memory unit may reside on one, two, or three distinct cells, in any grouping.

Figure 1:
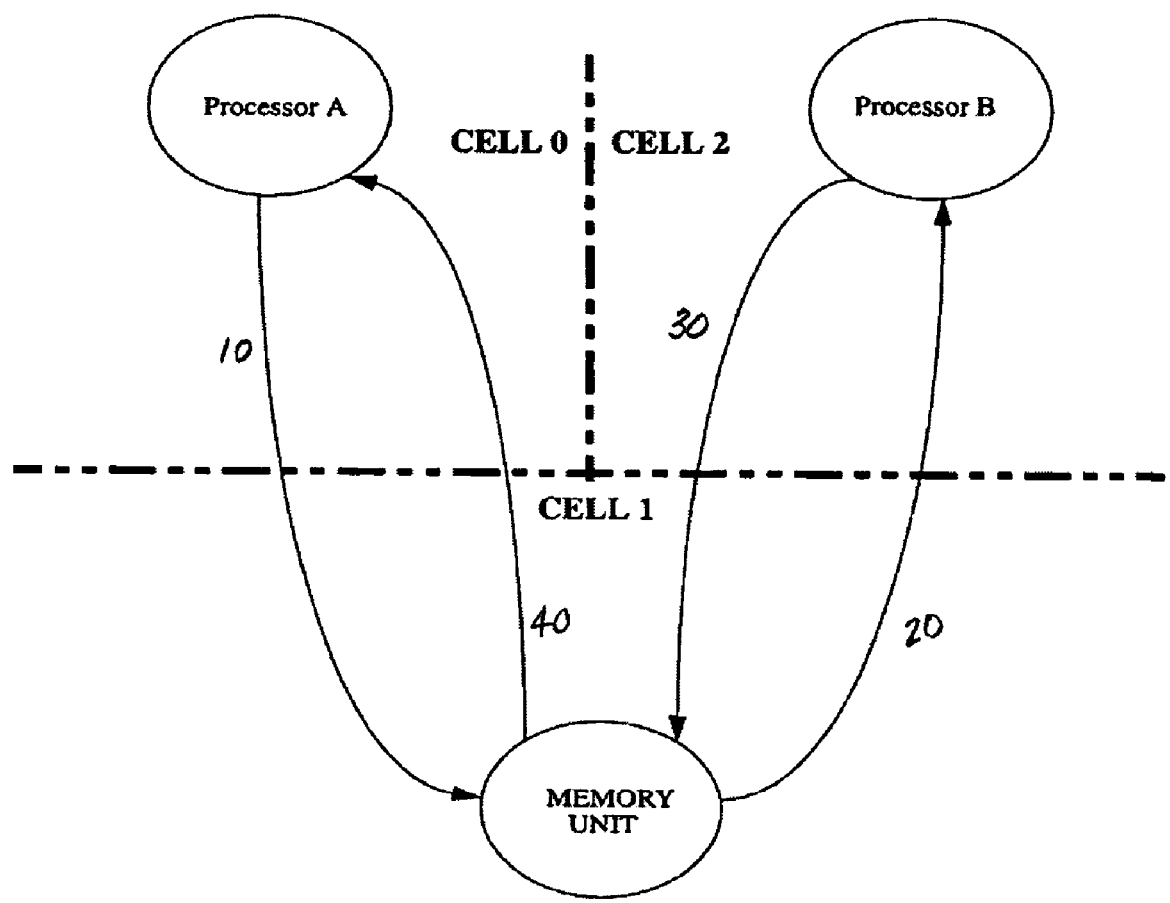
FIG. 1 is a simplified flow diagram showing some of the steps in requesting ownership of a cache line between processors in a multi-processor directory-based cache coherency system.
Figure 2:
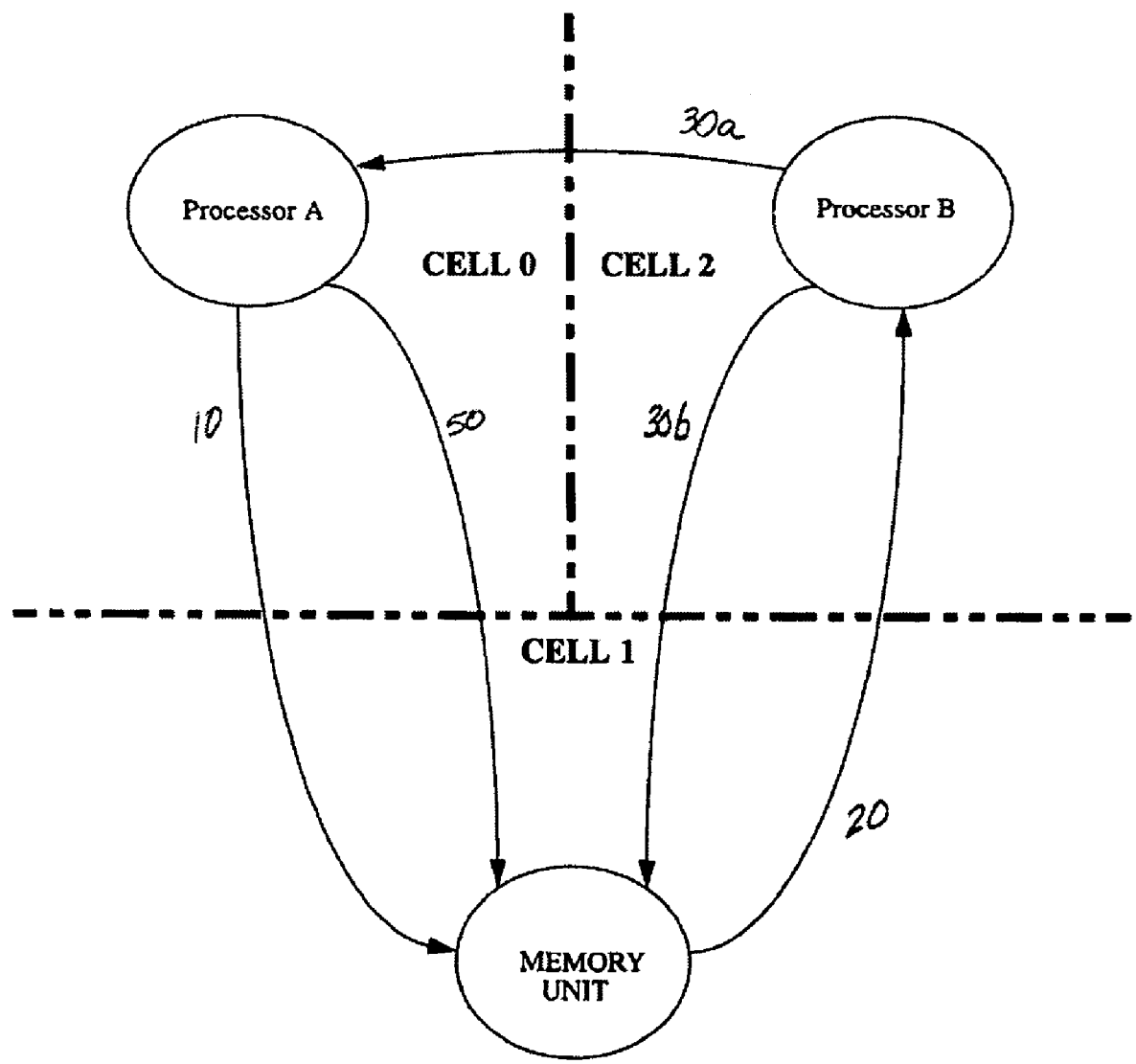
FIG. 2 is a simplified flow diagram illustrating a method according to one embodiment of the present invention.

The arrows in FIGS. 1 and 2 represent transactions sent between the processors and memory. The invention encompasses all implementations by which those transactions are sent, including packets, signals, busses, messages, and the like. The term "transaction" is used herein to cover all such implementations.

DETAILED DESCRIPTION

FIG. 1 illustrates in greatly simplified form a shared memory multiprocessor computer system that uses a directory-based cache coherency scheme. The simplified system is divided into three cells, arbitrarily designated Cell 0, Cell 1, and Cell 2. A first processor, arbitrarily designated Processor A, is associated with Cell 0. Another processor, arbitrarily designated Processor B, is associated with Cell 2. Both Processor A and Processor B have their own cache memory. A memory unit is associated with Cell 1 and is shared by both Processor A and Processor B.

If Processor A requires ownership of a cache line owned by the memory unit, a request transaction, which contains the memory address for the requested cache line stored in the memory unit, is sent from Processor A to the memory unit that owns the cache line, as represented by arrow 10. The memory unit receives the request transaction and determines from the DRAM tag for the memory address of the requested cache line that Processor B, associated with Cell 2, has ownership of the requested cache line. The memory unit then recalls the requested cache line out of Processor B's cache by sending a recall transaction, represented by arrow 20, to Processor B. In response, Processor B returns the cache line data and ownership of the requested cache line to the memory unit by sending a response transaction, as represented by arrow 30. Then, the memory unit transfers the cache line data and ownership of the requested cache line to Processor A by sending a data transaction, as represented by arrow 40.

A disadvantage of this method of operation is that, while ownership of the cache line is being requested by Processor A and transferred from Processor B to Processor A, the process running on Processor A is stalled until ownership of the requested cache line and data are sent to Processor A. The path represented by arrows 10, 20, 30, and 40 is referred to herein as the "latency critical path," and the time the process running on Processor A is stalled is referred to as "cache miss latency."

A method for reducing cache miss latency according to the invention is illustrated in greatly simplified form in FIG. 2. According to the embodiment illustrated in FIG. 2, one of the steps in the latency critical path is removed. As illustrated in FIG. 2, if Processor A requires ownership of a cache line owned by the memory unit, a request transaction, which contains the memory address, is sent from Processor A to the memory unit, as represented by arrow 10. The memory unit receives the request transaction and determines from the DRAM tag for the memory address of the requested cache line that Processor B, associated with Cell 2, has ownership of the requested cache line. The memory unit then sends a recall transaction, represented by arrow 20, to Processor B to recall the requested cache line out of Processor B's cache.

In response to the recall transaction, Processor B sends the cache line data and ownership of the requested cache line to the requesting processor, Processor A, by sending a data transaction, as represented by arrow 30*a*.

A copy of the cache line is sent to the memory unit to update the cache line held in the memory unit by sending a response transaction, as represented by arrow 30*b*. However, that is not necessary in all cases. In some cases, Processor B need not send a copy of the cache line to the memory unit. When Processor A requests ownership of a cache line, it can accompany that request with an indication that it either will, if requested, guarantee to provide that cache line to a different processor on a subsequent request, or will not guarantee to provide the cache line. If in the request for ownership of the cache line Processor A guarantees to provide the cache line in response to a subsequent request, the response from Processor B to the memory unit, represented by 30*b*, is sent to the memory unit without a copy of the cache line data. When used, this approach greatly reduces system bandwidth. However, this approach can only be used when Processor A guarantees in the initial request that the cache line data will be provided upon receipt of a subsequent request. If in the initial request Processor A does not guarantee it will provide the cache line on a subsequent request, the response indicated by 30*b* is sent to the memory unit with a copy of the cache line data.

To complete the coherency flow, a response transaction, represented by arrow 50, may be sent from Processor A to the memory unit. The transaction informs the memory that the cache line has been received by the original requesting processor, Processor A. In response, the memory unit updates the DRAM tag to indicate that ownership of the cache line has been transferred to Processor A.

Additionally, the response from Processor B to the memory unit, represented by 30*b*, can be omitted entirely when Processor A guarantees in the initial ownership request that the cache line data will be provided upon receipt of a subsequent request. In that event, the response transaction from Processor A, which informs the memory that the cache line has been received from Processor B, also necessarily informs the memory that Processor B has sent the cache line to Processor A. Thus, in that event the response represented by arrow 30*b* is not required.

The transaction flow depicted in FIG. 2 can also be carried out when Processor A, Processor B, and the memory unit reside on one or two cells in any manner. The transaction flow can also be carried out in a non cell-based system architecture. In addition, the invention is not limited to any particular number of processors or memory units.

The invention reduces cache miss latency in a multiprocessor system. The reduced idle time for stalled processes waiting for the requested data contained in a cache line allows applications and benchmarks to run significantly faster.

Although the present invention and its advantages have been described in detail, it should be understood that various changes, substitutions, and alterations can be made without departing from the spirit and scope of the invention as defined by the appended claims. Moreover, the scope of the present application is not intended to be limited to the particular embodiments of invention described in the specification. As one of ordinary skill in the art will readily appreciate from the foregoing description, processes, machines, articles of manufacture, compositions of matter, means, methods, or steps presently existing or later to be developed that perform substantially the same function or achieve substantially the same result as the corresponding embodiments described herein may be utilized to implement and carry out the present invention. Accordingly, the appended claims are intended to include within their scope such processes, machines, articles of manufacture, compositions of matter, means, methods, or steps.

The foregoing describes the invention in terms of embodiments foreseen by the inventors for which an enabling description was available, notwithstanding that insubstantial modifications of the invention, not presently foreseen, may nonetheless represent equivalents thereto.

What is claimed is:

1. Method of transferring ownership of a cache line between processors in a shared memory multi-processor computer system using a directory-based cache coherency scheme, the method comprising:
    sending a request transaction for ownership of a cache line from a first processor to a memory unit,
    determining from the memory unit a second processor having ownership of the requested cache line and sending a recall transaction to the second processor, and
    sending the requested cache line with ownership directly from the second processor to the first processor in response to the recall transaction regardless of whether an unacknowledged return request was sent by the second processor.

2. Method according to claim 1, further comprising sending a response transaction from the first processor to the memory unit to confirm receipt of the requested cache line by the first processor.

3. Method according to claim 1, further comprising sending a response transaction from the second processor to the memory unit to confirm that the second processor has sent the requested cache line to the first processor.

4. Method according to claim 3, wherein the response transaction from the second processor to the memory unit includes a copy of the data of the requested cache line.

5. Method according to claim 3, wherein the response transaction from the second processor to the memory unit includes a copy of the data for the requested cache line only when the request for ownership of the cache line from the first processor does not include a guarantee that the first processor will make the requested cache line data available in response to a subsequent request for ownership of the cache line.

6. Method according to claim 1, further comprising updating a tag in the memory unit to reflect transfer of ownership of the cache line to the first processor.

7. Method of transferring a cache line between processors in a shared memory multi-processor computer system that uses a directory-based cache coherency scheme, comprising
    sending a request transaction for ownership of a cache line from a first processor in an $m^{th}$ cell to a memory unit in an $n^{th}$ cell,
    determining from the memory unit a second processor in a $p^{th}$ cell having ownership of the requested cache line and sending a recall transaction to the second processor regardless of whether an unacknowledged return request was sent by the second processor,
    sending the requested cache line with ownership directly from the second processor to the first processor in response to the recall transaction, and
    sending a response transaction from the first processor to the memory unit to confirm receipt of the requested cache line by the first processor.

8. Method according to claim 7, wherein m=n=p.
9. Method according to claim 7, wherein m=n.
10. Method according to claim 7, wherein m=p.
11. Method according to claim 7, wherein n=p.
12. Method according to claim 7, further comprising sending a response transaction from the second processor to the memory unit to confirm that the second processor has sent the requested cache line to the first processor.
13. Method according to claim 12, wherein the response transaction from the second processor to the memory unit includes a copy of the data for the requested cache line.
14. Method according to claim 12, wherein the response transaction from the second processor to the memory unit includes a copy of the data for the requested cache line only when the request for ownership of the cache line from the first processor does not include a guarantee that the first processor will make the requested cache line data available in response to a subsequent request for ownership of the cache line.
15. Method according to claim 7, further comprising updating a tag in the memory unit to reflect transfer of ownership of the cache line to the first processor.
16. Method of transferring ownership of a cache line between processors in a shared memory multi-processor computer system that uses a directory-based cache coherency scheme, comprising sending a request transaction for ownership of a cache line from a first processor to a memory unit,
determining from the memory unit a second processor having ownership of the requested cache line and sending a recall transaction to the second processor,
sending the requested cache line with ownership directly from the second processor to the first processor in response to the recall transaction regardless of whether an unacknowledged return request was sent by the second processor,
sending a response transaction from the second processor to the memory unit to confirm that the second processor has sent the requested cache line to the first processor, together with a copy of the data for the requested cache line,
sending a response transaction from the first processor to the memory unit to confirm receipt of the requested cache line by the first processor, and
updating a tag in the memory unit to reflect transfer of ownership of the cache line to the first processor.

17. Apparatus for transferring ownership of a cache line between two processors in a multi-processor computer system using a directory-based cache coherency scheme having a shared memory unit, the apparatus comprising:

a first transaction line for providing a request transaction for ownership of a cache line from a first processor to the shared memory unit,
a second transaction line for providing a recall transaction to a second processor having ownership of the requested cache line, determined by the shared memory unit,
a third transaction line for providing transfer of the requested cache line with ownership directly from the second processor to the first processor in response to the recall transaction regardless of whether an unacknowledged return request was sent by the second processor, and
a fourth transaction line for providing a response transaction from the first processor to the shared memory unit to confirm receipt of ownership of the requested cache line by the first processor.

18. Apparatus according to claim 17, further comprising a fifth transaction line for providing a response transaction from the second processor to the memory unit to confirm transfer of the requested cache line from the second processor to the first processor.

19. Apparatus according to claim 17, further comprising a fifth transaction line for providing a response transaction from the second processor to the memory unit to confirm transfer of the requested cache line from the second processor to the first processor together with a copy of the data for the requested cache line.

* * * * *